(12) United States Patent
Englert

(10) Patent No.: US 6,531,210 B1
(45) Date of Patent: Mar. 11, 2003

(54) APPLICATION OF METHYLENEDIPHENYLDIISOCYANATE FOR PRODUCING GYPSUM/WOOD FIBER BOARD

(75) Inventor: Mark Englert, Libertyville, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 09/476,741

(22) Filed: Dec. 30, 1999

(51) Int. Cl.[7] .................................................. B32B 3/06
(52) U.S. Cl. .................................. 428/304.4; 428/307.3
(58) Field of Search ........................... 428/703, 292.1, 428/292.4, 304.4, 307.3; 106/780, 772; 423/555

(56) References Cited

U.S. PATENT DOCUMENTS

| | | |
|---|---|---|
| 3,967,016 A | 6/1976 | Schneller et al. |
| 5,609,916 A | 3/1997 | Fiori et al. |
| 5,609,962 A | 3/1997 | Ouhadi |
| 5,840,428 A | 11/1998 | Blizzard et al. |
| 5,840,800 A | 11/1998 | Joffre et al. |
| 5,849,837 A | 12/1998 | Wei et al. |

*Primary Examiner*—Richard Weisberger
(74) *Attorney, Agent, or Firm*—Lee, Mann, Smith, McWilliams, Sweeney & Ohlson; John M. Lorenzen; David F. Janci

(57) ABSTRACT

A process for making an improved gypsum/wood fiber board is described. Products resulting from the process are also described. The process comprises adding a diisocyanate, specifically methylenediphenyldiisocyanate (MDI) to an aqueous slurry of calcium sulfate material and cellulosic fibers, where the MDI is added as an emulsion stable in the conditions in which the slurry is maintained. The process further includes passing the MDI containing slurry onto a flat porous forming surface to form a filter cake; removing a substantial portion of the water from the filter cake through the porous surface; pressing the filter cake to form a board and remove additional water; and drying the board to remove the remaining free water.

7 Claims, No Drawings

APPLICATION OF METHYLENEDIPHENYLDIISOCYANATE FOR PRODUCING GYPSUM/WOOD FIBER BOARD

The present invention relates to an improved composite material; more particularly to a composite gypsum/cellulose fiber material having improved physical properties which are especially useful for making building products. Specifically, the present invention relates to a methylenediphenyldiisocyanate (MDI) impregnated gypsum/wood fiber building board having enhanced physical properties through the addition of an MDI emulsion to the gypsum and wood fiber during the board manufacturing process.

BACKGROUND OF THE INVENTION

Certain properties of gypsum (calcium sulfate dihydrate) make it very popular for use in making industrial and building products; especially gypsum wallboard. It is a plentiful and generally inexpensive raw material which, through a process of dehydration and rehydration, can be cast, molded, or otherwise formed into useful shapes. It is also noncombustible and relatively dimensionally stable when exposed to moisture. However, because it is a brittle, crystalline material which has relatively low tensile and flexural strength, its uses are typically limited to non-structural, non-load bearing and non-impact absorbing applications.

Gypsum wallboard; i.e., also known as plasterboard or drywall, consists of a rehydrated gypsum core sandwiched between multi-ply paper cover sheets, and is largely for interior wall and ceiling applications. Because of the brittleness and low nail and screw holding properties of its gypsum core, conventional drywall by itself cannot support heavy appended loads or absorb significant impact. Accordingly, means to improve the tensile, flexural, nail and screw holding strength and impact resistance of gypsum wallboard and building products have long been, and still are, earnestly sought.

Another readily available and affordable material, which is also widely used in building products, is lignocellulosic material particularly in the form of wood and paper fibers. For example, in addition to lumber, particleboard, fiberboard, waferboard, plywood and "hard" board (high density fiberboard) are some of the forms of processed lignocellulosic material products used in the building industry. Such materials have better tensile and flexural strength than gypsum wallboard. However, they are also generally higher in cost, have poor fire resistance and are not able to provide adequate strength in lower density products. Therefore, affordable means to remove these use-limiting properties of building products made from cellulosic material are also desired.

Previous attempts to combine the favorable properties of gypsum and cellulosic fibers, particularly wood fibers, are described in detail in U.S. Pat. Nos. 5,817,262 and 5,320,677, both herein incorporated by reference, and assigned to the United States Gypsum Company. It is an object of the present invention to improve upon the teachings of the '262 and '677[3] patents, and provide a gypsum/wood fiber board (GWF) product having improved strength, impact resistance, resistance to screw and nail pullout, and dimensional stability.

In general and as taught by the '262 and '677 patents, the process for making a composite GWF material begins with mixing between about 0.5% to about 30%, and preferably between 3% to 20%, by weight, wood fibers with the respective complement of ground, uncalcined gypsum. The dry mix is combined with enough liquid, preferably water, to form a dilute slurry having about 70%–95% by weight water. The slurry is processed in a pressure vessel, such as an autoclave, at a temperature of approximately 285 to 305 degrees F., which is sufficient to convert the gypsum to acicular calcium sulfate hemihydrate crystals. It is desirable to continuously agitate the slurry with gentle stirring or mixing to break up any fiber clumps and keep all the particles in suspension. After the hemihydrate has formed and has precipitated out of solution as hemihydrate crystals, the pressure on the product slurry is relieved when the slurry is discharged from the autoclave. It is at this point that any other desired additives are added to the slurry. While still hot, the slurry is added to a head box which distributes the slurry onto a porous felting conveyor. While on the conveyor, the slurry is dewatered by the action of vacuum pumps which draw the water through the felting conveyor, causing a filter cake to form on the conveyors surface. As much as 90% of the uncombined water may be removed from the filter cake by vacuum pumps. The temperature of the heated slurry is maintained at a temperature above about 160° F. until it has been substantially dewatered and wet pressed into a board. As a consequence of the water removal, the filter cake is cooled to a temperature at which point rehydration may begin. However, it may still be necessary to provide external cooling to bring the temperature low enough to accomplish the rehydration within an acceptable time.

Before extensive rehydration takes place, the filter cake is preferably wet-pressed into a board of desired thickness and/or density. If the board is to be given a special surface texture or a laminated surface finish, it would preferably occur during or following this step of the process. During the wet pressing, which preferably takes place with gradually increasing pressure to preserve the products integrity, two things happen: (1) additional water, for example about 50%–60% of the remaining water, is removed; and (2) as a consequence of the additional water removal, the filter cake is further cooled to a temperature at which rapid rehydration occurs. The calcium sulfate hemihydrate hydrates to gypsum, so that the acicular calcium hemihydrate crystals are converted to gypsum crystals in-situ in and around the wood fibers. After rehydration is complete, the boards can be cut and trimmed, if desired, and then sent through a kiln for drying. Preferably, the drying temperature should be kept low enough to avoid recalcining any gypsum on the surface.

The GWF product has historically relied on gypsum as the sole internal binder. While the use of gypsum as the sole core binder has worked well for the higher density GWF products such as the 55-pcf (pounds per cubic foot) exterior sheathing and 65-pcf underlayment products, it has not been able to provide adequate strength for lower density products. In particular, the gypsum-only GWF product has proved to possess inadequate flexural strength and stiffness for key low-density products such as furniture components and other wood-based applications. Thus, ways to improve the physical properties of the GWF product have been sought.

Beginning in the early 1980's, aqueous dispersions of isocyanate became commercially available. One of these dispersions, based on the use of a particular diisocyanate, MDI, has gained acceptance as a binder for particleboard and oriented strand board (OSB) in place of conventional phenol-formaldehyde resins. In considering the application of MDI to the GWF product, the MDI emulsion system described herein has a number of advantages over gypsum as a binder. MDI is a thermoset resin capable of forming chemical bonds with both hydroxyl groups on the cellulosic fibers as well as cross-linking with itself by reaction of the isocyanate group with water. Through judicious use of catalysts, one can preferentially catalyze either of those reactions if desired. MDI is also resistant to moisture and humidity and, if properly employed in the GWF panel, provides improved physical properties, such as flexural and tensile strength, resistance to nail and screw pull out and impact resistance.

Any binder, such as MDI, added to the GWF slurry must satisfy two conditions: (1) it must be stable in the temperature and chemical conditions present in the headbox, and (2), the binder must be retained in the basemat. These requirements have thwarted previous attempts to incorporate MDI into the GWF product.

Previous unsuccessful attempts have been made to utilize neat MDI as a core additive in a GWF product at a low level, approximately 2% by weight based on the total solids in the slurry. In the previous attempts, the neat MDI immediately reacted with water in the headbox and polymerized into a brown polymeric material resulting in the MDI being retained in the GWF basemat in the form of a localized polyurea solid. This immediate reaction and localization experienced in the previous attempts is undesirable since the MDI is not acting as a binder but is contained within the core of the product as an inert filler. In this condition, the MDI does not render an increase in strength to the GWF product. Tests have also shown that utilizing a premix of MDI and water leads to similar disappointing results because of its very limited stability.

The successful use of MDI in the GWF process rests on the MDI being stable in the head box so that it polymerizes some time later in the board forming process, and it rests on the MDI being retained in the filter cake or basemat. Specifically, any MDI additive must be stable at temperatures found in the headbox, approximately 180–205° F., and must also be stable in the ionic environment presented in the slurry. The gypsum and various additives in the slurry produce a variety of multivalent cations. $Ca^{+2}$ ions are present in a concentration of approximately 1800 ppm as a result of the solubility of the gypsum. $Al^{+3}$ or $K^+$ ions may be present depending upon the various additives used. The $Al^{+3}$ ions are typically present in a concentration of 900 ppm, but may be as high as 9000 ppm. The $Al^{+3}$ ions are generally derived from the accelerator alum, $Al_2(SO_3)_4$. The $K^+$ ions are typically in a concentration of 4500 ppm and are derived from the accelerator potassium sulfate, $K_2SO_4$. Thus, it is desirable to stabilize the MDI with an emulsifier or surfactant. The use of a stabilizing surfactant is further called for because MDI is not water soluble.

In a typical emulsion, water, MDI and a suitable surfactant are mixed under high shear so that the MDI is dispersed in the water as small droplets. The energy imparted to the system by the mixing largely controls the particle size of the resulting emulsion. In the absence of a suitable surfactant, as in the case of the premix of MDI, the dispersion of MDI particles in water eventually separates into two distinct phases. The surfactant acts to prevent this phase separation by stabilizing the individual MDI particles. On a microscopic level, the surfactant migrates to the MDI/water interface where it forms a layer with its hydrophilic portion oriented outwardly into the aqueous solution and its hydrophobic portion oriented adjacent to the MDI droplet surface. Under such a scenario, the surfactant can exhibit hydrogen bonding with the host particles, and thus remain in the basemat as the water is drawn off, rather than being siphoned out with it. In addition to hydrogen bonding, mechanical entrapment of the MDI with the gypsum and host particles also promotes a high retention of the MDI in the basement.

Surfactants are generally categorized into three classes, nonionic, cationic and anionic. Each of these surfactant classes has certain advantages and disadvantages in terms of what materials they can stabilize, how they react to high temperature, and how they react to the presence of electrolytes such as $Ca^{+2}$, $Al^3$ or $K^+$ ions which are present in the GWF furnish. The following are very general rules regarding the suitability of the three types of surfactants, as one skilled in the art will recognize.

Generally, nonionic surfactants are less suitable for a high temperature environment such as found in the headbox. The ethyleneoxide chains (EO) of the surfactants tend to coil upon themselves in such an environment. Under these conditions they lose their effectiveness as emulsion stabilizers. In order to increase heat stability, it is necessary to increase the hydrophobic/lipophobic balance (HLB) value of the surfactants. Nonionic surfactants are generally not affected by the presence of electrolytes, such as one might find in the GWF furnish.

Generally, anionic surfactants are not affected by high temperature and to that extent are suitable for the temperatures found in the headbox. However, certain anionic surfactants are adversely affected by multivalent cations which tend to bind with the anionic site.

Generally, cationic surfactants are not affected by either high temperature or the presence of electrolytes, and thus appear to be suitable for the GWF process. However, many cationic surfactants can contain small amounts of unreacted primary and secondary amines that can catalyze the reaction of MDI with water. This side reaction is not desired since it will lead to localized clumps of urea polymer which will not contribute to the strength of the final product. This unreacted primary and secondary amines can be scavenged by including an additive such as a Lewis acid.

Surfactants are also described in terms of how they act. An external surfactant does not react with either phase of the MDI and water solution, but simply resides at the interface between the two phases. Its presence at the interface is a dynamic process with surfactant molecules constantly leaving the interface for the bulk solution and arriving at the interface from the bulk solution.

If an external emulsifier is used, survivability of the MDI demands that the MDI emulsion utilize a high HLB nonionic emulsifier. It is known that the phase inversion temperature (PIT) varies directly with the HLB of the surfactant. Accordingly, a higher HLB emulsifier provides more heat stability to the resulting externally stabilized emulsion, and thus, the HLB value provides a good first indication of the general suitability of the surfactant. Additionally, it has been shown that cationic emulsifiers can be used in combination with high HLB nonionic surfactants to achieve suitable heat and electrolyte stability without the undesirable effects of using a cationic emulsifier alone.

An internal surfactant contains functional groups such that it actually chemically reacts with the dispersed phase. In an internally stabilized emulsion, the ethylene oxide chains are chemically attached onto the MDI backbone. By varying the molecular weight of the ethylene oxide chains (i.e., varying the number of EO groups on the chain), it is possible to adjust the "effective" HLB of the molecules.

If an internal emulsifier is used, survivability again demands that the MDI emulsion utilize a high HLB nonionic emulsifier. As discussed above, the HLB can be adjusted by varying the molecular weight of the ethylene oxide chains. Since the phase inversion temperature (PIT) varies directly with the HLB of the surfactant, a higher HLB, achieved by using more EO groups, provides more heat stability to the resulting internally stabilized emulsion.

Thus, because of the different characteristics of each type of surfactant, one must find a single surfactant or a combination of surfactants to achieve a stabilized emulsion that provides the requisite thermal and electrolyte stability.

SUMMARY OF THE INVENTION

It is a principal objective of the present invention to provide a gypsum and fiber building board having improved physical properties, which is formed by combining gypsum with another substance having higher strength, such as wood fiber, and having a MDI binder dispersed throughout said board, to provide stronger building products.

The present invention promotes the use of a diisocyanate chemical, MDI, which has the highest molecular weight, and consequently, the lowest vapor pressure of any readily available commercial diisocyanate. As a result, MDI is environmentally more friendly and safer when used in a production environment. The particular use of this isocyanate is also preferred over other diisocyanate chemicals such as toluene diisocyanate (TDI) in that it forms the hardest polymer compared to other commercially available isocyanates. A hard binder is advantageous because it imparts flexural strength in the product, producing a hard and stiff product.

It is a related objective to provide a process for producing such a gypsum composite building board wherein MDI is added to a heated slurry of calcium sulfate hemihydrate and another substance having higher strength, such as wood fiber, wherein said heated MDI-containing slurry is passed onto a porous, flat forming surface, such as a felting conveyor, to form a shaped filter cake which is further processed to provide the gypsum board product.

A more specific objective of the invention is to provide a paperless wallboard, which has uniformly good strength, including resistance to nail and screw pull-out, throughout its expanse and which is more dimensionally stable, fire resistant, and can be produced at a practical cost.

The main objectives are most preferably realized, according to the invention, by adding an MDI emulsion to a hot dilute slurry of a calcium sulfate hemihydrate material, which has been calcined under conditions that produce acicular alpha hemihydrate crystals traveling in and about the voids of a host particle of a stronger material and passing the slurry to a porous flat forming surface to form a filter cake which is dewatered with minimal loss of the MDI. The filter cake is pressed to form a board before the hemihydrate completely rehydrates to gypsum, after which the board is dried, where upon the emulsion breaks, allowing the MDI to react with remaining water and cellulosic fiber and to polymerize with itself.

DETAILED DESCRIPTION OF THE PREFERRED EMBODIMENT

The term "gypsum," as used herein, means calcium sulfate in the stable dihydrate state; i.e., $CaSO_4 \cdot 2H_2O$, and includes the naturally occurring mineral, the synthetically derived equivalents, and the dihydrate material formed by the hydration of calcium sulfate hemihydrate (stucco) or anhydrite. The term "calcium sulfate material," as used herein, means calcium sulfate in any of its forms, namely calcium sulfate anhydrite, calcium sulfate hemihydrate, calcium sulfate dihydrate and mixtures thereof.

The term "host particle" is meant to cover any macroscopic particle, such as a fiber, a chip or a flake, of a substance other than gypsum. The particle, which is generally insoluble in the slurry liquid, should also have accessible voids therein; whether pits, cracks, fissures, hollow cores or other surface imperfections, which are penetrable by the slurry menstruum and within which calcium sulfate dihydrate crystals can form. It is best if the voids are located over an appreciable portion of the particle. A greater number of voids and a greater distribution of the voids throughout the particle will lead to improved physical bonding as well as a more geometrically stable bond between the MDI, gypsum and host particle. The host particle should possess physical properties lacking in gypsum, such as better tensile and flexural strength. An example of a fiber well suited for the process and material described herein is a cellulosic fiber, particularly lignocellulosic fiber such as a wood fiber. Therefore, without intending to limit the material and/or particles that qualify as a "host particle," wood fiber(s) is often used hereafter for convenience in place of the broader term.

The term "MDI emulsion," as used herein, means an aqueous emulsion of MDI, which is stable in a GWF slurry under the conditions which maintain calcium sulfate hemihydrate crystals therein.

The basic process begins by mixing uncalcined gypsum and host particles (e.g., wood or paper fibers) with water to form a dilute aqueous slurry. The source of the gypsum may be from raw ore or from the by-product of a flue-gas-desulpherization or phosphoric-acid process. The gypsum should be of a relatively high purity, i.e., preferably at least about 92–96%, and finely ground. Larger particles are acceptable, but may lengthen the conversion time. The gypsum can be introduced either as a dry powder or via an aqueous slurry.

The host particle is preferably a cellulosic fiber which may come from waste paper, wood pulp, wood flakes, and/or another plant fiber source. It is preferred that 100% paper fiber is used, but mixtures of various fibers may be used, such as a mixture of 25% paper fiber and 75% spruce fiber by weight. It is preferable that the plant fiber be one that is porous, hollow, split or has a rough surface such that its physical geometry provides accessible interstices or voids which accommodate the penetration of dissolved calcium sulfate. Depending on the source of the fiber, for example wood pulp, the fiber may also require prior processing to break up clumps, separate oversized and undersized material, and, in some cases, pre-extract strength retarding materials and/or contaminants such as hemi celluloses or acetic acid, for example, that could adversely affect the calcination of the gypsum.

The ground gypsum and wood fibers are mixed with sufficient water to make a slurry containing about 5–30% by weight solids, although slurries containing about 10–20% by weight solids are preferred. The solids in the slurry should comprise from about 0.5% to 30% by weight of wood fibers and preferably about 10% wood fibers, the balance being mainly gypsum.

Conversion to Hemihydrate

The slurry is fed into a pressure vessel, such as an autoclave, equipped with a continuous stirring or mixing device. Crystal modifiers, such as organic acids, can be added to the slurry at this point, if desired, to stimulate or retard crystallization or to lower the calcining temperature.

Steam is injected into the vessel to bring the interior temperature of the vessel up to between about 212° F. (100° C.) and about 350° F. (177° C.), at an autogeneous pressure. The lower temperature is approximately the practical minimum at which the calcium sulfate dehydrate will calcine to the hemihydrate state within a reasonable time for operating a production line. The upper temperature is about the maximum temperature for calcining hemihydrate without an undue risk of causing some of the calcium sulfate hemihydrate to convert to anhydrite. The autoclave temperature is preferably about 285° F. (140° C.) to 305° F. (152° C.).

When the slurry is processed under these conditions for a sufficient period of time, preferably 15 minutes, enough water is driven out of the calcium sulfate dihydrate crystals to convert it to the acicular hemihydrate crystals. The solution, aided by the continuous agitation to keep the particles in suspension, wets out and penetrates the open voids in the host fibers. As saturation of the solution is reached, the hemihydrate nucleates and begins forming crystals in, on and around the voids and along the walls of the host fibers.

It is believed that during the autoclaving operation, the dissolved calcium sulfate penetrates into the voids in the wood fibers and subsequently precipitates as acicular hemihydrate crystals within, on and about the voids and surfaces of the wood-fibers. When the conversion is complete, the pressure on the autoclave is reduced, desired conventional additives including accelerators, retarders, preservatives, fire retardents and strength enhancing agents, and the MDI emulsion are introduced, typically at or just prior to the head box, and the slurry is discharged from the headbox onto a dewatering conveyor.

The MDI

The MDI emulsion is preferably added to the slurry after it has been released from the autoclave, preferably immediately prior to the head box, in order to provide sufficient time for the MDI to thoroughly mix with the slurry prior to the formation of the filter cake and the dewatering step of the process. The temperature of the slurry at the time the MDI emulsion is added is critical for the particular emulsion selected. That is, the MDI emulsion must be formulated so that it is stable at the particular temperature of the slurry at the time the MDI emulsion is mixed with the gypsum wood-fiber slurry. The MDI emulsion must remain stable in the presence of the additives, such as accelerators, that are present in the slurry. The MDI emulsion must not only have stability when it is added to the slurry, but must remain stable through the dewatering and board formation steps as well. Most importantly, a sufficient proportion of the MDI should be retained in the filter cake during the dewatering process. With sufficient retention, a noticeable increase in physical properties will usually be imparted when the quantity of the MDI emulsion added to the slurry is sufficient to provide at least about 3% by weight of MDI based on the weight of the total solids in the slurry. It is preferred to use from about 2% to about 14% by weight of MDI to achieve a high level of improvement. The preferred MDI is Mondur 1441 manufactured by Bayer.

The Emulsifier

The following examples describe the preparation of various MDI emulsions that can be employed in accordance with the method disclosed in the present invention to impart improved physical properties in GWF boards, but it is understood that these are examples and that many other gypsum wood fiber products having improved physical properties may be made using suitable variations.

The preferred nonionic emulsifier is a block polyol having an HLB number in excess of 20, to allow for a suitable thermal stability. Particularly, Macol 27, a block polyol having an HLB number of 22 and manufactured by PPG Industries is the preferred nonionic external emulsifier.

Preferred External Emulsion

The preferred externally stabilized MDI emulsion is a preparation of a Macol 27 stabilized Mondur 1441 emulsion (20.0% active). This emulsion contains:

| Water | 7960.8 g |
|---|---|
| Mondur 1441 MDI | 1990.2 g |
| Macol 27 (100% active) | 79.6 g |

This preparation constitutes a surfactant level of 4.0% active surfactant based on the weight of the MDI. The stable emulsion is prepared by adding deionized water and Macol 27, which is provided as a white powder. The mixture is stirred for approximately 10 minutes allowing the Macol 27 to dissolve. With vigorous mechanical agitation, the MDI is slowly added to the mixture to form the stable emulsion.

As an alternative preparation, cationic emulsifier such as a fatty acid quaternary amine sold by ICI Americas, Inc., of Wilmington, Del., under the designation G-265, may be added to the Macol 27 in a ratio of 1 part G-265 to 14 parts Macol 27.

Preferred Internal Emulsion

The preferred internally stabilized MDI emulsion is a preparation of Union Carbide Carbowax 5000 mixed with MDI Mondur 1441 at 60° C. (140° F). The Carbowax 5000 product is a methoxypolyethylene glycol with an average molecular weight of 5000 (n=113). The emulsion contains the following:

| Mondur 1441 MDI | 2000.00 g |
|---|---|
| Carbowax 5000 (100% active) | 120.00 g |

This preparation constitutes a polyethylene glycol (PEG) level of 6.0% based on the weight of the MDI. The stable emulsion is prepared by adding Mondur 1441 and Carbowax 5000 as a flake solid to an appropriate mixing vessel. The Carbowax 5000 and MDI are continuously stirred by mechanical means such as a stirring rod and heated to 140° F. for 180 minutes to completely dissolve the Carbowax 5000. The solution is allowed to cool to room temperature to reduce the reaction of the MDI and water. Under rapid mechanical stirring, 1990.2 gr. of the Carbowax 5000 and MDI mixture is added to 7960 gr. of deionized water in a suitable container to form the stabilized aqueous emulsion.

Adding Emulsion to Slurry

Once prepared, the stabile MDI emulsion is added to the slurry just prior to the headbox, typically into the piping that carries the slurry from the autoclave to the headbox. A mechanical stirring device, known to those skilled in the art, can be included in the piping to assist the mixture of the emulsion into the slurry.

Dewatering

The hot MDI-containing slurry is passed through the head box which distributes the slurry onto a flat porous forming surface to produce a filter cake. The filter cake is dewatered by the evaporation of water when the slurry is released from the autoclave and by the water in the slurry passing through the porous forming surface by gravity, and preferably aided by vacuum. Although the dewatering causes cooling of the filter cake, as much of the water is removed as possible while the temperature of the product slurry is still relatively high and before the hemihydrate is converted into gypsum. As much as 90% of the slurry water is removed in the dewatering device, leaving a filter cake of approximately 35% water by weight. At this stage the filter cake consists of wood fibers interlocked with rehydratable calcium sulfate hemihydrate crystals and can still be broken up into individual composite fibers or nodules, shaped, cast or compacted to a higher density.

The formation of the filter cake and the dewatering of the filter cake is preferably carried out using paper making equipment of the type described in U.S. Pat. No. 5,320,677, which is made a part of this disclosure.

Pressing and Rehydration

Dewatered filter cake is wet-pressed for a few minutes to further reduce the water content and to compact the filter cake into the desired shape, thickness and/or density. Although the extraction of the bulk of the water in the dewatering step will contribute significantly to lowering the filter cake temperature, additional external cooling may be required to reach the desired level within a reasonable time. The temperature of the filter cake is preferably reduced to below about 120° F. (49° C.), so that relatively rapid rehydration can take place. The rehydration recrystallizes the alpha hemihydrate crystals into acicular gypsum crystals in place, physically interlocked with the wood fibers.

Depending on the accelerators, retarders, crystal modifiers or other additives provided in the slurry, hydration may take from only a few minutes to an hour or more. Because of the interlocking of the acicular hemihydrate crystals with the wood-fibers, and the removal of most of the carrier liquid from the filter cake, migration of the calcium sulfate is averted, leaving a homogeneous composite. The rehydration effects a recrystallization of the hemihydrate crystals to dihydrate crystals in-situ, i.e., within and about the voids of the wood fibers, thereby preserving the homogeneity of the composite. The crystal growth also connects the calcium sulfate crystals on adjacent fibers to form an overall crystalline mass, enhanced in strength by the reinforcement of the wood fibers.

When the hydration is complete, it is desirable to promptly dry the composite mass to remove the remaining free water. Otherwise, the hygroscopic wood fibers tend to hold, or even absorb, uncombined water which will later evaporate. If the calcium sulfate coating is fully set before the extra water is driven off, the fibers may shrink and pull away from the gypsum when the uncombined water does evaporate. Therefore, for optimum results it is preferable to remove as much excess free water from the composite mass as possible before the temperature drops below the level at which hydration begins.

Drying

The pressed board, which typically contains about 30% by weight of free water, is then promptly dried at a relatively high temperature in order to reduce the free water content to about 0.5% or less in the final product. Drying conditions above 200°F. (93°C.) which tend to calcine the gypsum should be avoided. The set and dried board can be cut and otherwise finished to desired specification.

When finally set, the unique composite material exhibits desired properties contributed by all of its components. The wood fibers increase the strength, particularly flexural strength, of the gypsum matrix, while the gypsum acts as a coating and binder to protect the wood fiber, impart fire resistant and decrease expansion due to moisture. The MDI imparts improved tensile and flexural strength to the material as well as providing improved impact resistance and resistance to nail and screw pullout.

Results

The following table summarizes the strength increase achieved in GWF wallboard by using the internal and external emulsions described in examples 1 and 2 above. "MD" indicates the sample was cut and analyzed with its longest direction in the machine direction. "CMD" indicates the sample was cut with its longest direction across the machine direction. As indicated, the MDI was added at either a 3% or 6% level based upon the weight of the total solids in the slurry.

At the 3% addition level, specific strength improvements of 51% (internal emulsifier) and 31% (external emulsifier) were observed. At the 6% additional level, specific strength improvements of 57% (internal emulsifier) and 10% (external emulsifier) were observed.

| Percent MDI | | Density (pcf) | MOR (psi) | Specific Strength (psi) |
|---|---|---|---|---|
| Control (0% MDI) | MD | 41.5 | 434 | 652 |
| | CMD | 36.6 | 415 | 708 |
| 3.00% (Internal) | MD | 43.4 | 718 | 1031 |
| | CMD | 38.7 | 667 | 1029 |
| 6.00% (Internal) | MD | 45.4 | 718 | 987 |
| | CMD | 41.1 | 760 | 1154 |
| 3.00% (External) | MD | 43.5 | 718 | 851 |
| | CMD | 38.7 | 667 | 934 |
| 6.00% (External) | MD | 41.4 | 446 | 673 |
| | CMD | 39.8 | 533 | 835 |

The forms of invention shown and described herein are to be considered only as illustrative. It will be apparent to those skilled in the art that numerous modifications may be made therein without departing from the spirit of the invention and the scope of the appended claims.

I claim:

1. A composite material, comprising: a host particle of non-gypsum material and having voids penetrable by gypsum crystals on its surfaces and within a portion of its body; acicular gypsum crystals at least some of which have been formed in-situ in and about the voids of the host particle, forming a calcium sulfate crystalline matrix physically interlocked with the host particle; and a polymerized diisocyanate binder further binding the host particles to one another.

2. The composite material of claim 1, wherein the diisocyanate binder is uniformly distributed within the composite material.

3. The composite material of claim 2 wherein the diisocyanate binder is methylenediphenyldiisocyanate.

4. The composite material of claim 3 wherein the methylenediphenyldiisocyanate increases the tensile and flexural strength of the final product by at least 30% when compared to the composite material without methylenediphenyldiisocyanate.

5. The composite material of claim 3 wherein the host particle is a cellulosic substance.

6. The composite product of claim 5 wherein the cellulosic substance is wood or paper fibers.

7. The composite product of claim 2, wherein the product has a density between 38–45 pcf.

* * * * *